United States Patent
Husemann et al.

(10) Patent No.: US 6,831,114 B2
(45) Date of Patent: Dec. 14, 2004

(54) PRESSURE SENSITIVELY ADHESIVE POLYACRYLATES

(75) Inventors: Marc Husemann, Hamburg (DE); Stephan Zöllner, Hamburg (DE)

(73) Assignee: tesa AG, Hamburg (DE)

( * ) Notice: Subject to any disclaimer, the term of this patent is extended or adjusted under 35 U.S.C. 154(b) by 100 days.

(21) Appl. No.: 10/170,176

(22) Filed: Jun. 12, 2002

(65) Prior Publication Data

US 2003/0088031 A1 May 8, 2003

(30) Foreign Application Priority Data

Oct. 5, 2001 (DE) ......................................... 101 49 077

(51) Int. Cl.$^7$ ................................................. C08F 2/46
(52) U.S. Cl. ....................... 522/35; 522/129; 522/130; 522/133; 522/904
(58) Field of Search .......................... 522/35, 133, 129, 522/130, 904, 905

(56) References Cited

U.S. PATENT DOCUMENTS

| | | | |
|---|---|---|---|
| 4,144,157 A | 3/1979 | Guse et al. ............ | 204/159.23 |
| 4,454,218 A | 6/1984 | Dueber et al. .............. | 430/277 |
| 4,565,769 A | 1/1986 | Dueber et al. .............. | 430/281 |
| 4,569,769 A | 2/1986 | Walton et al. .............. | 210/759 |
| 5,264,533 A | 11/1993 | Rehmer et al. ............. | 526/301 |
| 5,294,688 A | 3/1994 | Rehmer et al. ............. | 526/260 |
| 5,391,406 A | 2/1995 | Ramharack et al. ........ | 427/516 |
| 5,536,759 A | 7/1996 | Ramharack et al. .......... | 522/35 |
| 5,741,543 A | 4/1998 | Winslow et al. .......... | 427/208.4 |
| 6,294,591 B1 * | 9/2001 | Blum et al. .................... | 522/35 |

FOREIGN PATENT DOCUMENTS

| | | | |
|---|---|---|---|
| DE | 27 43 979 | 4/1979 | .............. C09J/7/02 |
| DE | 44 33 290 | 3/1996 | ......... C07D/203/18 |
| DE | 196 53 631 | 6/1998 | ............ C08F/20/18 |
| DE | 100 53 563 | 5/2002 | ............... C09J/4/02 |
| EP | 0 893 456 | 1/1999 | ............. C08F/8/00 |
| EP | 1 067 144 | 1/2001 | ............. C08F/8/00 |

* cited by examiner

Primary Examiner—Robert D. Harlan
(74) Attorney, Agent, or Firm—Norris McLaughlin & Marcus PA

(57) ABSTRACT

Process for preparing UV crosslinkable acrylic pressure sensitive adhesives, which comprises reacting polyacrylates in the melt with UV-photoactive substances in a hotmelt process in a polymer-analogous reaction, the UV-photoactive substances being able to absorb radiation energy and transfer it to a reaction system.

18 Claims, No Drawings

PRESSURE SENSITIVELY ADHESIVE POLYACRYLATES

The invention relates to a process for preparing UV-crosslinkable acrylic pressure sensitive adhesives (PSAs) and also to the use of acrylic PSAs of this kind.

Hotmelt PSAs are compounds which combine the properties of hotmelt adhesives with those of pressure sensitive adhesives. Hotmelt PSAs melt at elevated temperatures and cool to form a permanently tacky film which flows adhesively on contact with a substrate. In combination with various substrates, such as paper, fabric, metal, and polymer films, for example, it is possible to produce a large number of different products, especially pressure sensitive adhesive tapes and also labels. These pressure sensitive adhesive products have a broad field of application in the automobile industry, e.g. for fastening or for sealing, or in the pharmaceutical industry, e.g., for active substance patches.

The typical coating temperature for hotmelt PSAs is between 80 and 180° C. In order to minimize coating and processing temperatures, the molecular weight of the hotmelt PSA to be applied should be as low as possible. On the other hand, the PSA must also possess a certain level of cohesion, so that the pressure sensitive adhesive tape does not slip from the substrate in use. In order to increase the cohesion, therefore, a high molecular weight is essential.

In principle, the cohesion of acrylic PSAs can be raised by means of efficient crosslinking. In U.S. Pat. No. 5,536,759, polyacrylates containing hydroxyl or carboxylic acid groups were reacted with 1-(1-isocyanato-1-methylethyl)-3-(1-methylethenyl)benzene (m-TMI). By functionalization with the double bonds, the polyacrylates described can be crosslinked very efficiently with UV light and thus produce PSAs possessing high cohesion. Disadvantages of this process include the high toxicity of the isocyanates used and also the complex two-stage process, since in a first step the polymerization is carried out and then in a second step the polymer-analogous reaction has to be carried out in a reactor. Moreover, double-bond-functionalized polyacrylates do not possess great thermal stability and are sensitive to shearing. Ultimately, these polymers are unsuitable for the hotmelt process, since the UV photoinitiators are not attached to the polymer and are therefore liable to undergo volatilization at the high temperatures normal for the hotmelt process.

In U.S. Pat. No. 5,741,543 double-bond-functionalized polyacrylates prepared by way of a polymer-analogous reaction are UV crosslinked. The polymers have been prepared by way of the UV prepolymerization technique and therefore have the known disadvantages such as slow process speeds and the free circulation of monomers.

The disadvantage of the volatile photoinitiators can be avoided by copolymerizing, for example, acrylated benzophenone derivatives as UV photoinitiators (U.S. Pat. No. 5,264,533). In U.S. Pat. No. 5,294,688 these copolymerizable UV photoinitiators were also described for acrylic PSAs. In U.S. Pat. No. 4,144,157, copolymerizable benzoin UV photoinitiators were described for acrylic PSAs. All of the methods have the disadvantage, however, that the UV photoinitiators used must first be synthesized in a separate, complex step, and are not available commercially. Moreover, the copolymerization of UV photoinitiators is hampered by problems, since acrylic PSAs are normally prepared by free-radical polymerizations and intermediate radicals may interact with the photoinitiator. The result is that instances of gelling occur which can only be compensated by means of high regulator fractions, which in turn reduces the average molecular weight. Moreover, following UV irradiation of the systems described, inter alia, in DE 27 43 979 A1, benzaldehyde is formed, and is perceptible as a disruptive odor.

U.S. Pat. Nos. 4,565,769 and 4,454,218 describe photosensitizers for photopolymerizations in photoresist technology. These photosensitizers are reacted with the polymer in a polymer-analogous reaction. The polymers described are not, however, used for acrylic PSAs. Instead, the photosensitizers are used for the polymerization and not for the UV crosslinking. Further disadvantages are that unbound UV photoinitiators are added as well and that no continuous process is possible.

Derived from the prior art described above, therefore, there is a need for a process for preparing UV-crosslinkable acrylic hotmelt PSAs which are easy to concentrate and can be processed by the hotmelt process in which for UV crosslinking the polymer is functionalized with UV photoinitiators and, following the coating operation, is crosslinked on the backing as an acrylic hotmelt PSA.

Surprisingly for the skilled worker, this object is achieved by the process of the invention depicted in the main claim. Further claims relate to advantageous developments of the process.

The invention accordingly provides a process for preparing UV-crosslinkable acrylic pressure sensitive adhesives, polyacrylates being reacted in a hotmelt process in the melt with UV-photoactive substances which are able to absorb radiation energy and transfer it to a reaction system.

In one particularly preferred development of the inventive process the polyarcrylates used are those having the following composition or those which can be prepared by polymerizing a monomer mixture comprising the following components:

(a) from 45 to 99.5% by weight of acrylic and/or methacrylic acid derivatives of the formula

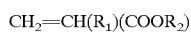

where $R_1$ is H or $CH_3$ and $R_2$ is an alkyl chain having from 1 to 20 carbon atoms, (b) from 0.5 to 25% by weight of vinyl compounds containing functional groups Y selected such that they are able to enter into chemical coupling reactions with the UV-photoactive substances or parts thereof, in particular with the group X of the UV-photoactive substances which is defined in more detail below.

One further advantageous variant of the process starts from a monomer mixture to which as a further component there are added (c) up to 30% by weight of olefinically unsaturated monomers, especially monomers containing functional groups.

In one very advantageous embodiment of the pressure sensitive adhesive, component (a) comprises one or more components which can be described by the following general formula

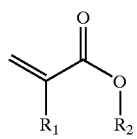

In this formula $R_1$ is H or $CH_3$ and the radical $R_2$ is selected from the group consisting of branched and unbranched saturated alkyl groups having from 4 to 14 carbon atoms. Acrylic monomers which are used with preference as component (a) for the inventive PSA comprise acrylic and methacrylic esters with alkyl groups composed of from 4 to 14 carbon atoms, preferably from 4 to 9 carbon atoms. Specific examples, listed without wishing to impose any unnecessary restriction, include n-butyl acrylate, n-pentyl acrylate, n-hexyl acrylate, n-heptyl acrylate, n-octyl acrylate, n-nonyl acrylate, and their branched isomers, such as 2-ethylhexyl acrylate, for example.

Examples of suitable vinyl compounds containing functional groups as component (b), capable in particular of a reaction with UV photoinitiators of type (I), include one or more carboxylic anhydrides, such as maleic anhydride or itaconic anhydride, for example, or acrylated or methacrylated carboxylic anhydrides, such as 4-(methacryloyloxyethyl)trimellitic anhydride, for example, or hydroxy-functionalized monomers, such as hydroxyethyl acrylate or hydroxyethyl methacrylate, for example, or carboxyl-functionalized monomers, such as acrylic and methacrylic acid, for example, or amine-functionalized monomers, such as dimethylformamide, for example, isocyanate-functionalized monomers, such as MOI, for example, or epoxidized monomers, such as glycidyl methacrylate, for example, or, generally, all monomers containing a functional group able to enter into a chemical coupling with UV photoinitiators and/or photosensitizers.

As monomers (b) it is possible to use compounds of the following general formula

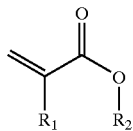

where $R_1$ is H or $CH_3$ and the radical —$OR_2$ comprises or represents a functional group. Particularly preferred examples of component (c) are, for example, hydroxyethyl acrylate, hydroxypropyl acrylate, hydroxyethyl methacrylate, hydroxypropyl methacrylate, acrylic acid, methacrylic acid, allyl alcohol, itaconic acid, and glycidyl methacrylate, this list not being conclusive and making no claim to completeness.

As component (c) it is possible outstandingly to use vinyl compounds, such as vinyl acetate, acrylamides, styrene, vinyl chloride, and benzyl acrylate, for example.

Additionally, vinyl monomers from the following groups are used optionally as component (c): Vinyl esters, vinyl ethers, vinyl halides, vinylidene halides, vinyl compounds containing aromatic rings and heterocycles in the α position.

Here again, some examples may be given nonexclusively: vinyl acetate, vinylformamide, vinylpyridine, ethyl vinyl ether, vinyl chloride, vinylidene chloride, acrylonitrile.

Additionally, as monomers for component (c) use is made preferentially of styrene or, generally, monomeric aryl compounds, which may also contain heterocycles or heteroatoms.

As UV-photoactive substances it is possible outstandingly to use photoinitiators and/or photosensitizers. The former are capable of breaking down into free radicals (or ions) on exposure to light of appropriate wavelength and so of initiating polymerization reactions or crosslinking reactions. The latter absorb radiation energy and transfer it to a reaction system without undergoing permanent changes.

Use is made in particular of UV-photoactive substances which carry a functional group X which is capable of a chemical coupling reaction. This functional group X may be represented preferably by one of the following groups or may comprise one of the following groups and/or compounds:

Hydroxyl groups (alcohols), thiols, isocyanates, carboxylic anhydrides, amines, amides, aldehydes, oxazolines and/or epoxides.

In general, UV photoinitiators may be subdivided into Norrish type I and type II photoinitiators, with possible examples of both classes being benzophenone, acetophenone, benzil, benzoin, hydroxyalkylphenone, phenyl cyclohexyl ketone, anthraquinone, thioxanthone, triazine or fluorenone derivatives, this listing making no claim to completeness.

Compounds referred to as Norrish type I photoinitiators are those which on exposure to light break down in accordance with a Norrish type I reaction. It is conventionally the photofragmentation of a carbonyl compound, in which the bond to a carbon atom α to the carbonyl group is cleaved radically (α cleavage) to produce an acyl radical and an alkyl radical.

For the purposes of the invention, the Norrish photoinitiators also include those where instead of the carbonyl group another functional group is present and where cleavage relates to the bond between this group and an α carbon atom.

Norrish type II photoinitiators break down on exposure to light in accordance with a Norrish type II reaction with hydrogen abstraction; this is an intramolecular reaction.

In the case of aliphatic ketones, a hydrogen may be eliminated from the γ position to one corresponding to the functional group shown above.

Examples of Norrish photoinitiators of both types in accordance with the invention are benzophenone, acetophenone, benzil, benzoin, hydroxyalkylphenone, phenyl cyclohexyl ketone, anthraquinone, thioxanthone, triazine or fluorenone derivatives, without this listing imposing any unnecessary restriction. The type I initiators include, in particular, aromatic carbonyl compounds, such as benzoin derivatives, benzil ketals and acetophenone derivatives. Type II photoinitiators are, in particular, aromatic ketones, such as benzophenone, benzil or thioxanthones, for example.

For further details see, for example, Römpp Lexikon Chemie—Version 2.0, Stuttgart/New York: Georg Thieme Verlag 1999.

Furthermore, there also exist photoinitiators based on triazine, hexaarylbisimidazole, and dye. A good overview is given here in Chemistry & Technology of UV & EB Formulation for Coatings, Inks & Paints, Vol. 5, by Dowling, Pappas, Monroe, Carroy, Decker, ed. by P K T Oldring, Sita Technology, London, England.

Particularly advantageous for use are UV photoinitiators and/or UV-photosensitizers which carry a functional group X capable of chemical reaction with the function group Y of the comonomers corresponding to component (b), corresponding for instance to the general formula

where UV-P is the UV-photoactive substance.

The functional group X may be present in the following chemical compounds, without this listing making any claim to completeness: hydroxyl groups (alcohols), thiols, isocyanates, carboxylic anhydrides, amines, amides, aldehydes, oxazolines and epoxides.

UV-P may be present in UV photoinitiators and UV photosensitizers, a large number of possible structures having already been given. In one preferred version of the invention, amine and hydroxy-functionalized photoinitiators and photosensitizers are used. In a very preferred version, the compounds of the following formula 1a [α-benzyl-α-(dimethylamino)-4-morpholinobutyrophenon], 1b [3-[4-(dimethylamino)phenyl]-1-[4-(2-hydroxyethoxy)phenyl]-2-propen-1-one], 1c [benzoin] and 1d [1-hydroxycyclohexyl phenyl ketone] are used.

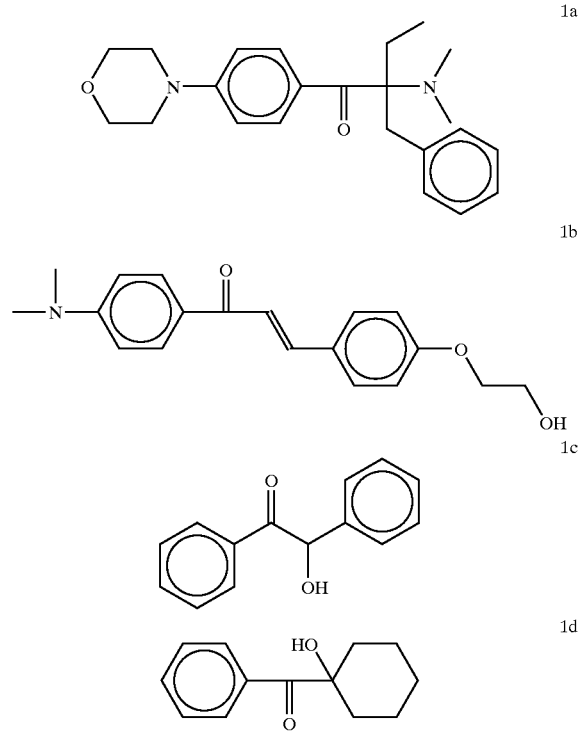

For the process of the invention the monomers of components (a), (b), and, where appropriate, (c) are converted by polymerization into pressure sensitively adhesive polyacrylates. For polymerization the monomers are chosen such that the resulting polymers can be used as industrial PSAs, especially such that the resulting polymers possess pressure sensitively adhesive properties in accordance with the "Handbook of Pressure Sensitive Adhesive Technology" by Donatas Satas (van Nostrand, N.Y. 1989). For these applications the static glass transition temperature of the resulting polymer will advantageously be situated below 25° C.

The polymerization may be conducted in the presence of one or more organic solvents and/or in the presence of water. In one advantageous embodiment of the process there are additional cosolvents or surfactants, such as glycols or ammonium salts of fatty acids. Preferred processes use as little solvent as possible. Suitable organic solvents or mixtures of solvents are pure alkanes (hexane, heptane, octane, isooctane), aromatic hydrocarbons (benzene, toluene, xylene), esters (ethyl, propyl, butyl or heptyl acetate), halogenated hydrocarbons (chlorobenzene), alkanols (methanol, ethanol, ethylene glycol, ethylene glycol monomethyl ether), and ethers (diethyl ether, dibutyl ether) or mixtures thereof. A water-miscible or hydrophilic cosolvent may be added to the aqueous polymerization reactions in order to ensure that the reaction mixture is present in the form of one homogeneous phase during monomer conversion. Cosolvents which can be used with advantage for the present invention are chosen from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxyether derivatives, amino alcohols, ketones and the like, and also derivatives and mixtures thereof.

The polymers prepared preferably have an average molecular weight $M_w$ (weight average) of from 50 000 to 1 200 000 g/mol, more preferably between 300 000 and 800 000 g/mol. The average molecular weight $M_w$ is determined by size exclusion chromatography (gel permeation chromatography, GPC) or matrix-assisted laser desorption/ionization mass spectrometry (MALDI-MS).

Very preferably, the acrylic PSA is freed from the solvent. For this purpose the polyacrylates prepared as described above are concentrated to a polylacrylate composition whose solvent content is ≦2% by weight. This process takes place preferably in a concentration extruder. In one preferred version concentration takes place in a vent extruder or using a single-screw or twin-screw extruder, the latter being operable corotatingly or counterrotatingly. In a manner which is very advantageous for the process of the invention, the amount of solvent in the polyacrylate composition following the concentration process is less than 0.5% by weight. Following concentration, in the inventive process the above-described functionalized UV photoinitiators and/or UV photosensitizers are added. This addition takes place preferably in a compounder or kneading apparatus, it being possible again to use a twin-screw extruder as the compounder. Equipment suitable for compounding further includes all of the mixing equipment known to the skilled worker, including for example a ring extruder.

The molar fraction of the functionalized UV photoinitiators and UV photosensitizers used for the reactive extrusion is equal to or significantly less than the molar amount of the functionalized monomers in accordance with component (b) that are incorporated by copolymerization in the polyacrylate chain. In one preferred procedure, catalysts are added in order to increase the reactivity. The fraction of the catalysts is between 0.01 and 100 mol %, but preferably between 0.1 and 5 mol %, based on the molar fraction of the functional group(s) of the UV photoinitiators and UV photosensitizers.

Additionally, it is also possible to use coupling reagents which promote the formation of the C—C bond. In this case it is possible, for example, to use N,N'-dicyclohexylcarbodiimide, dicyclohexylurea, N,N'-carbonyldiimidazole, and diethyl azodicarboxylate in conjunction with triphenylphosphine, this listing making no claim to completeness. Further coupling reagents are listed and cited in Advanced Organic Chemistry, Reactions, Mechanisms and Structure, 4th ed., Jerry March, 1992, John Wiley & Sons.

In one preferred variant, furthermore, the polymer-analogous reactions proceed under acid or base catalysis. As acids it is possible to use any Lewis-acidic compounds. The reaction takes place preferentially with p-toluenesulfonic acid or itaconic acid. As bases it is possible to use any Lewis bases. The reaction takes place preferentially with catalysis by 4-vinylaniline or sodium acetate.

In accordance with the flow viscosity of the polyacrylate used and the reactivity of the components, the reactive extrusion proceeds at elevated temperatures. The temperatures in the inline process (continuous regime) may be between 60 and 180° C., very preferably between 100 and 180° C.

For the use of the polyacrylates prepared by the inventive process as PSAs, they are optionally optimized by blending with at least one resin. As tackifying resins to be added it is possible to use any known tackifying resin described in the literature. Representatively, mention may be made of pinene resins, indene resins and rosins, their disproportionated, hydrogenated, polymerized, esterified derivatives and salts, the aliphatic and aromatic hydrocarbon resins, terpene resins and terpene-phenolic resins, and also C5 resins, C9 resins and other hydrocarbon resins. Any desired combinations of these and further resins may be used in order to adjust the properties of the resultant adhesive in accordance with what is desired. In general it is possible to use any resin which is compatible (soluble) with the corresponding polyacrylate; reference may be made in particular to all aliphatic, aromatic, and alkylaromatic hydrocarbon resins, hydrocarbon resins based on straight monomers, hydrogenated hydrocarbon resins, functional hydrocarbon resins, and natural resins. Explicit reference may be made to the depiction of the state of the art in the "Handbook of Pressure Sensitive Adhesive Technology" by Donatas Satas (van Nostrand, 1989).

In a further advantageous development one or more plasticizers, such as low molecular mass polyacrylates, phthalates, whale oil plasticizers or plasticizer resins, for example, are added to the PSA.

The acrylic PSA may further advantageously be blended with one or more additives such as aging inhibitors, light stabilizers, ozone protectants, fatty acids, resins, nucleating agents, blowing agents, compounding agents and/or accelerators.

They may further be admixed with one or more fillers such as fibers, carbon black, zinc oxide, titanium dioxide, solid or hollow glass (micro)beads, microbeads of other materials, silica, silicates, and chalk, the addition of blocking-free isocyanates also being possible.

For the inventive process it may further be of advantage to add compounds to the acrylic hotmelt which facilitate subsequent crosslinking. For this purpose the polymers may optionally be blended with crosslinkers. Examples of suitable crosslinkers are functional acrylates. Preferred substances in accordance with the inventive process which crosslink under radiation are, for example, difunctional or trifunctional acrylates or difunctional or polyfunctional urethane acrylates. It is, however, also possible here to use any further difunctional or polyfunctional compounds which are familiar to the skilled worker and are capable of crosslinking polyacrylates. For optional thermal crosslinking it is possible to use blocked difunctional or polyfunctional isocyanates.

In addition, further, uncopolymerized photoinitiators may be added. Useful photoinitiators which are very good to use are benzoin ethers, such as benzoin methyl ether and benzoin isopropyl ether, for example, substituted acetophenones, such as 2,2-diethoxyacetophenone (available as Irgacure 651 from Ciba Geigy), 2,2-dimethoxy-2-phenyl-1-phenylethanone, and dimethoxyhydroxyacetophenone, for example, substituted alpha-ketols, such as 2-methoxy-2-hydroxypropiophenone, for example, aromatic sulfonyl chlorides, such as 2-naphthyl-sulfonyl chloride, for example, and photoactive oximes, such as 1-phenyl-1,2-propanedione 2-(O-ethoxycarbonyl) oxime.

One further development which makes the process of the invention particularly advantageous for the production of adhesive tapes, for example, is notable in that the blended pressure sensitive adhesive is further processed from the melt and that it is applied in particular to a backing.

As backing material, for adhesive tapes for example, it is possible here to use materials which are customary and familiar to the skilled worker, such as films (polyesters, PET, PE, PP, BOPP, PVC), nonwovens, foams, wovens, and woven sheets, and also release paper (glassine, HDPE, LDPE). This listing is not intended to be conclusive.

The hotmelt PSAs of the invention are crosslinked by brief UV radiation in the range from 200 to 500 nm using commercially customary high or medium pressure mercury lamps with an output of, for example, from 80 to 240 w/cm. For UV crosslinking it may be appropriate to adapt the lamp output to the belt speed or to shade off the belt partly, with the belt running slowly, in order to reduce its thermal load. The irradiation time is guided by the model and output of the respective lamps.

Very preferably, UV crosslinking takes place after coating from the melt onto a backing.

It may be appropriate additionally to subject the acrylic PSA described in accordance with the invention to crosslinking with electron beams. This type of crosslinking can also take place in addition to the UV crosslinking. Thermal crosslinking is initiated in a temperature range from 100 to 180° C. Electron beam curing takes place by means of ionizing radiation.

The invention further provides for the use of the resulting pressure sensitive adhesive for an adhesive tape, the acrylic pressure sensitive adhesive being present in the form of a film on one or both sides of a backing.

The intention of the text below is to illustrate the invention by means of a number of examples, without wishing to subject it thereby to any unnecessary restriction.

EXAMPLES

Test Methods

Shear Strength (Test A)

A 13 mm wide strip of the adhesive tape was applied to a smooth and cleaned steel surface. The application area was 20 mm×13 mm (length×width).

At room temperature, a 1 kg weight was fastened to the adhesive tape and the time which elapsed until the weight fell off was measured.

The measured shear stability times are each reported in minutes and correspond to the average of three measurements.

Determinaton of the Gel Fraction (Test B)

The carefully dried, solvent-free samples of adhesive are welded into a nonwoven polyethylene pouch (Tyvek nonwoven). The difference in the sample weights before extraction and after extraction with toluene gives the gel index, as a percentage expression of the weight fraction of the polymer which is insoluble in toluene.

IR Spectroscopy (Test C)

The FT-IR IFS 45 spectrometer from Bruker was used for the measurement. First of all, a calibration plot was constructed using different concentrations of acrylic acid and maleic anhydride. In order to determine the conversion of the corresponding fractions of acrylic acid and/or maleic anhydride, the percentage drop in the corresponding CO band was measured.

Gel Permeation Chromatography GPC (Test D)

The average molecular weight $M_w$ was determined by gel permeation chromatography. The eluent used was THF with 0.1% by volume trifluoroacetic acid. Measurement was carried out at 25° C. The precolumn used was PSS-SDV, 5$\mu$, $10^3$ Å, ID 8.0 mm×50 mm. Separation was carried out using the columns PSS-SDV, 5µ, $10^3$ and also $10^5$ and $10^6$ each of ID 8.0 mm×300 mm. The sample concentration was 4 g/l, the flow rate 1.0 ml per minute. Measurement was made against PMMA standards.

Procedure

Procedure for the Hotmelt Process in a Recording Extruder (Method 1):

Compounding of the acrylic pressure sensitive adhesive with the functional photoinitiators and/or photosensitizers was carried out using the Haake Rheomix 610p recording extruder. The drive unit available was the Rheocord RC 300p instrument. The instrument was controlled using the PolyLab System software. The extruder was filled in each case with 52 g of pure acrylic hotmelt PSA (~80% fill level). The experiments were conducted at a kneading temperature of 160° C., a rotary speed of 40 rpm, and a kneading time of 15 minutes.

Subsequently, using a Labcoater with two heatable rolls, the specimens were applied to a backing material with a coatweight of 50 g/m².

UV Crosslinking (Method 2):

For UV irradiation at 254 nm a UV unit from Eltosch was used. The unit is equipped with a medium pressure Hg UV lamp having an intensity of 120 w/cm. The swatches were each passed through the unit at a speed of 20 m/min, the specimens being irradiated in a number of passes in order to increase the irradiated dose. The recorded UV dose is reported in J/cm².

For UV irradiation at 320–450 nm a BK-150 UV unit from Arcure Technologies was used. The iron-doped lamp possesses an intensity of 200 w/cm. The swatches were each passed through the unit at a speed of 20 m/min, the specimens being irradiated in a number of passes in order to increase the irradiated dose. The recorded UV dose is reported in J/cm².

Functional UV Photoinitiators and UV-photosensitizers:

The compounds 1a (α-benzyl-α-(dimethylamino)-4-morpholinobutyrophenone, 1c (benzoin) and, 1d (1-hydroxycyclohexyl phenyl ketone) are available commercially from Sigma-Aldrich. The compound 1b (3-[4-(dimethylamino)phenyl]-1-[4-(2-hydroxyethoxy)phenyl]-2-propen-1one) was synthesized in the laboratory.

3-[4-(Dimethylamino)phenyl]-1-[4-(2-hydroxethoxy)phenyl]-2-propen-1-one:

A mixture of 15 g of 2-bromoethanol, 16.3 g of p-hydroxyacetophenone and 5.3 g of sodium hydroxide in 100 ml of dimethylformamide (DMF) was heated at 150° C. for 15 hours. The mixture was then poured into water and the product was extracted with dichloromethane. Subsequent vacuum distillation gave 11.4 g of a white solid (4-(2-hydroxyethoxy)-acetophenone).

In a second reaction a mixture of 8.3 g of p-dimethylaminobenzaldehyde, 10.0 g of 4-(2-hydroxyethoxy)acetophenone and 2.5 g of sodium hydroxide in 100 ml of methanol was heated under reflux for 10 hours. The reaction mixture was subsequently cooled using an ice bath and filtered, and the solid isolated by filtration was washed with cold methanol. The product was subsequently dried in a vacuum drying oven at 40° C. and 10 torr. This gave 10.2 g of white solid.

The melting point was 128° C. (cf. U.S. Pat. No. 4,565,769, m.p.: 127–128.5° C.)

Example 1

A reactor conventional for free-radical polymerizations was charged with 760 g of 2-ethylhexyl acrylate, 40 g of acrylic acid and 540 g of acetone/isopropanol (92/8). After 45 minutes of passing nitrogen gas through the reactor and degassing twice, the reactor was heated to 58° C. with stirring and then 0.4 g of α,α-azodiisobutyronitrile (AIBN) was added. The external heating bath was subsequently heated to 70° C. and the reaction was carried out constantly at this external temperature. After a reaction time of 1.5 h a further 0.4 g of AIBN was added. After 3 h and 6 h, the batch was diluted each time with 250 g of acetone/isopropanol (92/8). After a reaction time of 48 h, the reaction was terminated and the system was cooled to room temperature. The adhesive was freed from the solvent in a vacuum/drying cabinet. Subsequently, the procedure of method 1 was followed and the hotmelt PSA was reacted with 0.5% by weight of 1a (α-benzyl-α-(dimethylamino)-4-morpholinobutyrophenone) in a recording extruder. The conversion of the reaction, based on the photoinitiator, was more than 95%. For UV crosslinking, the procedure of method 2 was followed. Crosslinking was carried out using the Eltosch unit. Finally, after UV crosslinking, test methods A and B were conducted.

Example 2

A procedure similar to that of Example 1 was followed. The acrylic hotmelt PSA was reacted with 0.5% by weight of 1a (α-benzyl-α-(dimethylamino)-4-morpholinobutyrophenone) and with 0.5% by weight of 1b (3-[4-(dimethylamino)phenyl]-1-[4-(2-hydroxyethoxy)phenyl]-2-propen-1-one) in a recording extruder. The conversion of the reaction, based on the photoinitiator used, was more than 95%. For UV crosslinking the procedure of method 2 was carried out. Crosslinking was carried out using the Arcure unit. Finally, after UV crosslinking, test methods A and B were conducted.

Example 3

A procedure similar to that of Example 1 was followed. The acrylic hotmelt PSA was reacted with 0.5% by weight of 1b (3-[4-(dimethylamino)phenyl]-1-[4-(2-hydroxyethoxy)phenyl]-2-propen-1-one) and 0.5% by weight of 2,2'-bis(o-chlorophenyl)-4,4',5,5'-tetraphenyl-1,1'-bisimidazole (cf. DuPont, U.S. Pat. No. 4,311,783) in a recording extruder. The conversion of the reaction, based on the photoinitiator used, was more than 95%. For UV crosslinking the procedure of method 2 was carried out. Crosslinking was carried out using the Arcure unit. Finally, after UV crosslinking, test methods A and B were conducted.

Example 4

A reactor conventional for free-radical polymerizations was charged with 320 g of 2-ethylhexyl acrylate, 320 g of n-butyl acrylate, 120 g of methyl acrylate, 40 g of maleic anhydride and 200 g of acetone/isopropanol (97/3). After 45 minutes of passing nitrogen gas through the reactor and degassing twice, the reactor was heated to 58° C. with stirring and then 0.6 g of α,α-azodiisobutyronitrile (AIBN) was added. The external heating bath was subsequently heated to 70° C. and the reaction was carried out constantly at this external temperature. After a reaction time of 1.5 h a further 0.6 g of AIBN was added. After 6 hours, the batch was diluted with 250 g of acetone/isopropanol (97/3). After 48 h, a further 0.6 g of AIBN was added and the batch was diluted with 250 g of acetone/isopropanol (97/3). After a reaction time of 72 h, the reaction was terminated and the system was cooled to room temperature. The adhesive was freed from the solvent in a vacuum/drying cabinet. Subsequently, the procedure of method 1 was followed and the hotmelt PSA was reacted with 0.5% by weight of 1b (3-[4-(dimethylamino)phenyl]-1-[4-(2-hydroxyethoxy)phenyl]-2-propen-1-one) and 0.5% by weight of 2,2'-bis(o-chlorophenyl)-4,4',5,5'-tetraphenyl-1,1'-bisimidazole (cf. DuPont, U.S. Pat. No. 4,311,783) in a recording extruder. The conversion of the reaction, based on the photoinitiator used, was more than 95%. For UV crosslinking, the procedure of method 2 was followed. Crosslinking was carried out using the Arcure unit. Finally, after UV crosslinking, test methods A and B were conducted.

Example 5

A procedure similar to that of Example 4 was followed. The acrylic hotmelt PSA was reacted with 0.5% by weight of 1c (benzoin) and 0.25% by weight of sodium acetate in a recording extruder. The conversion of the reaction, based on the photoinitiator used, was about 90%. For UV crosslinking the procedure of method 2 was carried out. Crosslinking was carried out using the Eltosch unit. Finally, after UV crosslinking, test methods A and B were conducted.

Example 6

A procedure similar to that of Example 4 was followed. The acrylic hotmelt PSA was reacted with 0.5% by weight of 1d (1-(hydroxycyclohexyl) phenyl ketonr) and 0.25% by weight of sodium acetate in a recording extruder. The conversion of the reaction, based on the photoinitiator used, was about 80%. For UV crosslinking the procedure of method 2 was carried out. Crosslinking was carried out using the Eltosch unit. Finally, after UV crosslinking, test methods A and B were conducted.

Results

Examples 1 to 6 demonstrate that reactive extrusion has taken place. In all of the examples a conversion of at least 80% was found via IR. Moreover, no instances of gelling were observed. In order now to investigate the suitability of this process for producing acrylate hotmelt PSA tapes, further test methods were carried out. Table 1 lists the conditions of UV irradiation. In order to be able to assess the efficiency of UV irradiation, the gel index of the individual PSAs was measured. The gel index correlates with the crosslinked fraction of the polymer.

The UV dose was set by a number of passes through the beam path of the UV lamps. The dose rises linearly with each pass. The results are summarized in Table 1:

TABLE 1

| Example | UV irradiation; number of passes | Gel index [%] |
|---------|----------------------------------|---------------|
| 1 | 4 | 50 |
| 2 | 8 | 56 |
| 3 | 8 | 58 |
| 4 | 8 | 47 |
| 5 | 6 | 52 |
| 6 | 6 | 55 |

Table 1 shows that the gel indices fluctuate from 47 to 58%. This range lies within the optimum for acrylic PSAs, which are normally crosslinked within a range from 40 to 60% in order to obtain optimum pressure sensitive adhesion properties.

In order to be able to assess the technical adhesive properties of these UV-crosslinkable acrylic PSAs, the shear strength is determined by shear stability time measurement. The shear strength is another important criterion of the efficiency of crosslinking and of the technical adhesive properties of a pressure sensitive adhesive. Only when UV crosslinking proceeds efficiently is it possible to expect good shear strengths for the acrylic hotmelt PSA sprepared inventively. Table 2 therefore lists the shear strengths measured, again in conjunction with the number of passes in UV irradiation, for the individual examples.

TABLE 2

| Example | UV irradiation; number of passes | SST [10 N, RT] [min.] |
|---------|----------------------------------|------------------------|
| 1 | 4 | 4250 |
| 2 | 8 | 3585 |
| 3 | 8 | 4015 |
| 4 | 8 | 1520 |
| 5 | 6 | 2095 |
| 6 | 6 | 1240 |

SST: Shear stability time

Examples 1 to 6 all exhibit a marked shear strength at room temperature: a further sign of successful UV crosslinking. For Examples 1 to 3 the shear strength is at a somewhat higher level. The shear strength is influenced, however, not only by the degree of crosslinking but also by the comonomer composition and the average molecular weight.

In summary, the process described offers a simple possibility for preparing UV crosslinkable acrylic hotmelt PSAs, the photoinitiators and/or photosensitizers attached to the polymer chain achieving greater crosslinking efficiency than in the case of acrylic hotmelt PSAs with free photoinitatior; additionally, there are a large number of photoinitiators available which contain a functional group and can therefore be reacted by reactive extrusion. The existing path to the preparation of copolymerizable photoinitiators with subsequent polymerization can therefore be avoided. Moreover, the free-radical polymerization of acrylic PSAs and copolymerizable photoinitiators may be accompanied by interactions which lead to gelling of the acrylic PSA. This too can be avoided with the inventive process.

We claim:

1. A process for preparing UV crosslinkable acrylic pressure sensitive adhesives, which comprises reacting polyacrylates in the melt with UV-photoactive substances wherein the UV-photoactive substances have functional groups which are capable of a chemical coupling reaction and which functional groups are selected from the group consisting of hydroxyl, thiol, isocyanate, carboxylic anhydride, amine, amide, aldehyde, oxazoline and epoxy.

2. The process as claimed in claim 1, wherein said UV-photoactive substances are photoinitiators.

3. The process as claimed in claim 1, wherein said UV-photoactive substances are photosensitizers.

4. The process as claimed in claim 1, wherein the polyacrylates are prepared by polymerizing a monomer mixture comprising the following components
   (a) from 45 to 99.5% by weight of one or more monomers selected from the group consisting of acrylic mold derivatives and methacrylic acid derivatives of the formula $$CH_2 = CH(R_1)(COOR_2) \qquad (I)$$ 

where $R_1$ is H or $CH_3$ and $R_2$ is an alkyl chain having from 1 to 20 carbon atoms,
   (b) from 0.5 to 25% by weight of vinyl compounds containing functional groups which are capable of entering into a chemical coupling reaction with the functional groups of the UV-photoactive substances.

5. The process as claimed in claim 4, wherein said monomer mixture further comprises component (c) up to 30% by weight of olefinically unsaturated monomers.

6. The process as claimed in claim 4, wherein said vinyl compound sare one or more members of the group consisting of: carboxylic anhydrides, hydroxy-functionalized monomers, carboxyl-functionalized monomers, amine-functionalized monomers, isocyanate-functionalized monomers, and epoxidized monomers.

7. The process as claimed in claim 1, wherein said melt comprises a solvent content which is ≦2% by weight.

8. The process of claim 1, wherein said reaction is conducted at between 60 and 180° C., in a kneading device or compounder.

9. The process as claimed in claim 1, wherein catalysts are added before or during the reaction.

10. The process as claimed claim 4, wherein resins or other additives are added to the monomer mixture or to the acrylic pressure sensitive adhesive.

11. The process as claimed in claim 1, comprising the further step of applying the product of said reaction, as a melt, to a backing.

12. The process as claimed in claim 11, wherein the pressure sensitive adhesive is crosslinked with UV radiation following application to said backing.

13. An adhesive tape comprising an acrylic pressure-sensitive adhesive prepared by the process of claim 1, applied to one or both sides of a backing.

14. The process of claim 5, wherein said olefinically unsaturated monomers contain functional groups.

15. The process as claimed in claim 5, wherein said binyl compounds are one or more members of the group consisting of: carboxylic anhydrides, hydroxy-functionalized monomers, carboxyl-functionalized monomers, amine-functionalized monomers, isocyanate-functionalized monomers, and epoxidized monomers.

16. The process of claim 8, wherein said reaction is conducted at a temperature between 100 and 160° C.

17. The process of claim 9, wherein said catalysts are Lewis acids or Lewis bases.

18. The process of claim 10, wherein said additives are one or more members of the group consisting of aging inhibitors, light stabilizers, ozone protectants, fatty acids, plasticizers, nucleating agents, blowing agents, accelerators and fillers.

* * * * *

UNITED STATES PATENT AND TRADEMARK OFFICE
CERTIFICATE OF CORRECTION

| | |
|---|---|
| PATENT NO. | : 6,831,114 B2 |
| APPLICATION NO. | : 10/170176 |
| DATED | : December 14, 2004 |
| INVENTOR(S) | : Husemann et al. |

Page 1 of 1

It is certified that error appears in the above-identified patent and that said Letters Patent is hereby corrected as shown below:

Column 13, Line 7, "compound sare" should read -- compounds are --

Column 14, Line 9, "binyl" should read -- vinyl --

Signed and Sealed this

Sixteenth Day of October, 2007

JON W. DUDAS
*Director of the United States Patent and Trademark Office*